US010650252B2

(12) United States Patent
Kaneko et al.

(10) Patent No.: US 10,650,252 B2
(45) Date of Patent: May 12, 2020

(54) LANE DETECTION DEVICE AND LANE DETECTION METHOD

(71) Applicant: Hitachi, Ltd., Chiyoda-ku, Tokyo (JP)

(72) Inventors: Alex Masuo Kaneko, Tokyo (JP); Kenjiro Yamamoto, Tokyo (JP); Taiki Iimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 122 days.

(21) Appl. No.: 15/570,528

(22) PCT Filed: Mar. 9, 2016

(86) PCT No.: PCT/JP2016/057340
§ 371 (c)(1),
(2) Date: Oct. 30, 2017

(87) PCT Pub. No.: WO2016/178335
PCT Pub. Date: Nov. 10, 2016

(65) Prior Publication Data
US 2018/0150700 A1    May 31, 2018

(30) Foreign Application Priority Data
May 7, 2015    (JP) ................... 2015-094593

(51) Int. Cl.
*G06K 9/00* (2006.01)
*G06T 7/174* (2017.01)
(Continued)

(52) U.S. Cl.
CPC ......... *G06K 9/00798* (2013.01); *B60W 30/12* (2013.01); *G06T 7/13* (2017.01);
(Continued)

(58) Field of Classification Search
CPC ........... G06T 7/13; G06T 7/174; G06T 7/536; G06T 7/97; G06T 2207/10016;
(Continued)

(56) References Cited

U.S. PATENT DOCUMENTS 6,829,388 B1 * 12/2004 Sakurai ................. G06T 7/12
340/435
8,396,299 B2 * 3/2013 Sakurai .............. G06K 9/00798
382/199

(Continued)

FOREIGN PATENT DOCUMENTS

JP    11-53551 A    2/1999
JP    2000-132677 A    5/2000
(Continued)

OTHER PUBLICATIONS

Machine translation of JP 2008-250904 (Year: 2008).*
(Continued)

*Primary Examiner* — Katrina R Fujita
(74) *Attorney, Agent, or Firm* — Crowell & Moring LLP

(57) ABSTRACT

The reliability of detection of the traveling lane can be improved even in a case where an image capturing environment changes. The lane detection device includes a first image capturing device which is fixed to a moving body and periodically captures a first image under a predetermined first image capturing condition, a second image capturing device which is fixed to the moving body and periodically captures a second image under a second image capturing condition different from the predetermined first image capturing condition, and an operation device, regarding a traveling lane on which the moving body travels, which detects a first boundary line of the traveling lane on the first image, detects a second boundary line of the traveling lane on the second image, and estimates the position of the first boundary line on the first image based on a position of the second
(Continued)

boundary line on the second image under a predetermined execution condition.

11 Claims, 7 Drawing Sheets

(51) Int. Cl.
| | | |
|---|---|---|
| *G06T 7/13* | (2017.01) | |
| *B60W 30/12* | (2020.01) | |
| *G06T 7/536* | (2017.01) | |
| *G06T 7/00* | (2017.01) | |
| *G08G 1/16* | (2006.01) | |

(52) U.S. Cl.
CPC .............. *G06T 7/174* (2017.01); *G06T 7/536* (2017.01); *G06T 7/97* (2017.01); *G06T 2207/10016* (2013.01); *G06T 2207/10024* (2013.01); *G06T 2207/30256* (2013.01); *G08G 1/167* (2013.01)

(58) Field of Classification Search
CPC ........... G06T 2207/10024; G06T 2207/30256; B60W 30/12; G08G 1/167; G06K 9/00798
See application file for complete search history.

(56) References Cited

U.S. PATENT DOCUMENTS

| | | | |
|---|---|---|---|
| 9,090,263 B2* | 7/2015 | Zeng | ............ B60W 40/06 |
| 2007/0165909 A1* | 7/2007 | Leleve | ............ G05D 1/0246 |
| | | | 382/104 |
| 2010/0309674 A1* | 12/2010 | Su | ............ B60G 17/01908 |
| | | | 362/466 |
| 2011/0238252 A1* | 9/2011 | Takeda | ............ B60W 40/072 |
| | | | 701/31.4 |
| 2012/0099763 A1* | 4/2012 | Katoh | ............ G06K 9/00805 |
| | | | 382/103 |
| 2014/0043473 A1* | 2/2014 | Gupta | ............ H04N 17/00 |
| | | | 348/135 |
| 2014/0092237 A1* | 4/2014 | Watanabe | ............ B60R 1/00 |
| | | | 348/118 |
| 2015/0049193 A1* | 2/2015 | Gupta | ............ G03B 43/00 |
| | | | 348/148 |
| 2015/0248771 A1* | 9/2015 | Kim | ............ G06T 7/12 |
| | | | 382/169 |

FOREIGN PATENT DOCUMENTS

| | | |
|---|---|---|
| JP | 2002-99999 A | 4/2002 |
| JP | 2007-220028 A | 8/2007 |
| JP | 2008-250904 A | 10/2008 |
| JP | 2010-286995 A | 12/2010 |

OTHER PUBLICATIONS

International Search Report (PCT/ISA/210) issued in PCT Application No. PCT/JP2016/057340 dated Apr. 26, 2016 with English-language translation (Four (4) pages).

Japanese-language Written Opinion (PCT/ISA/237) issued in PCT Application No. PCT/JP2016/057340 dated Apr. 26, 2016 (Five (5) pages).

Japanese-language Office Action issued in counterpart Japanese Application No. 2017-516565 dated Dec. 25, 2018 with unverified English translation (eight pages).

* cited by examiner

[Fig. 1]
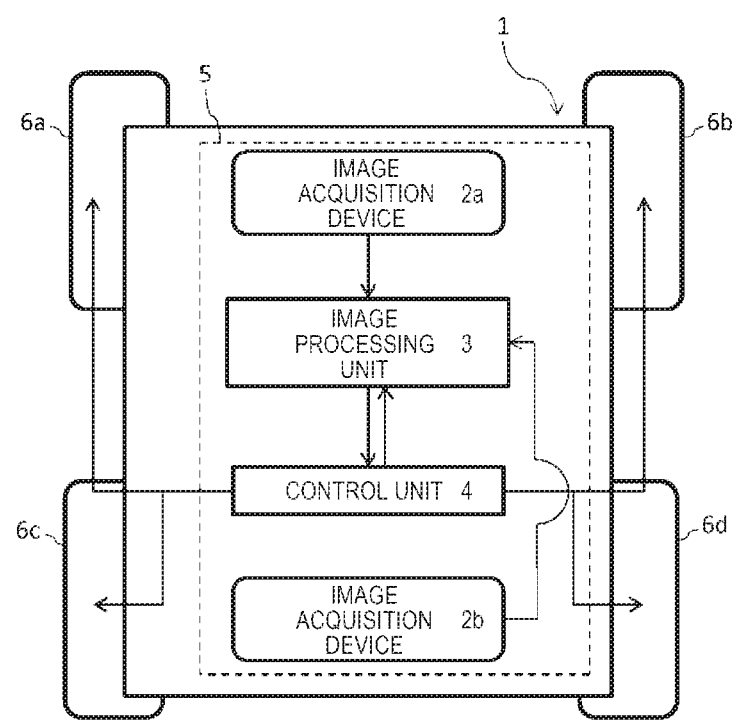

[Fig. 2]
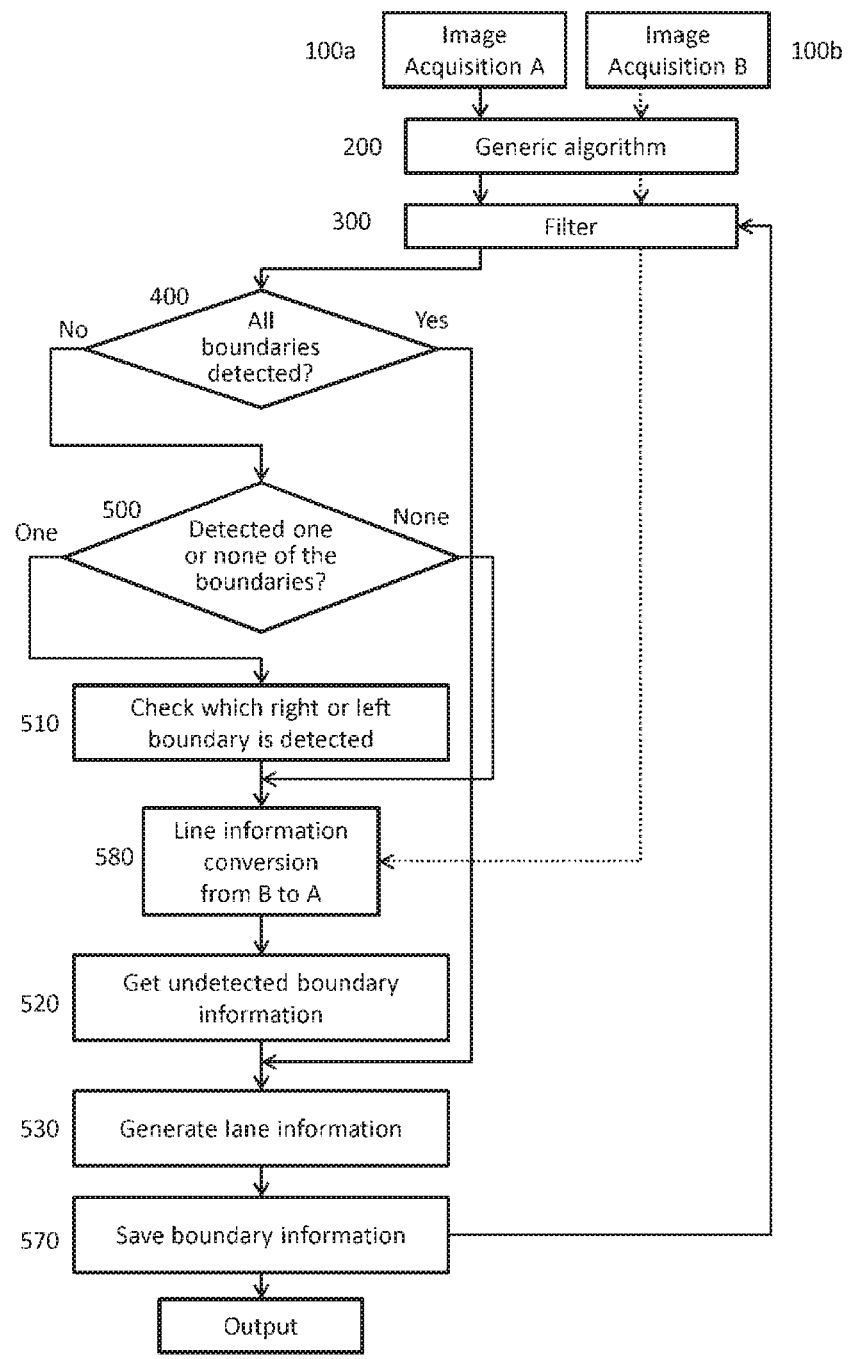

[Fig. 3]
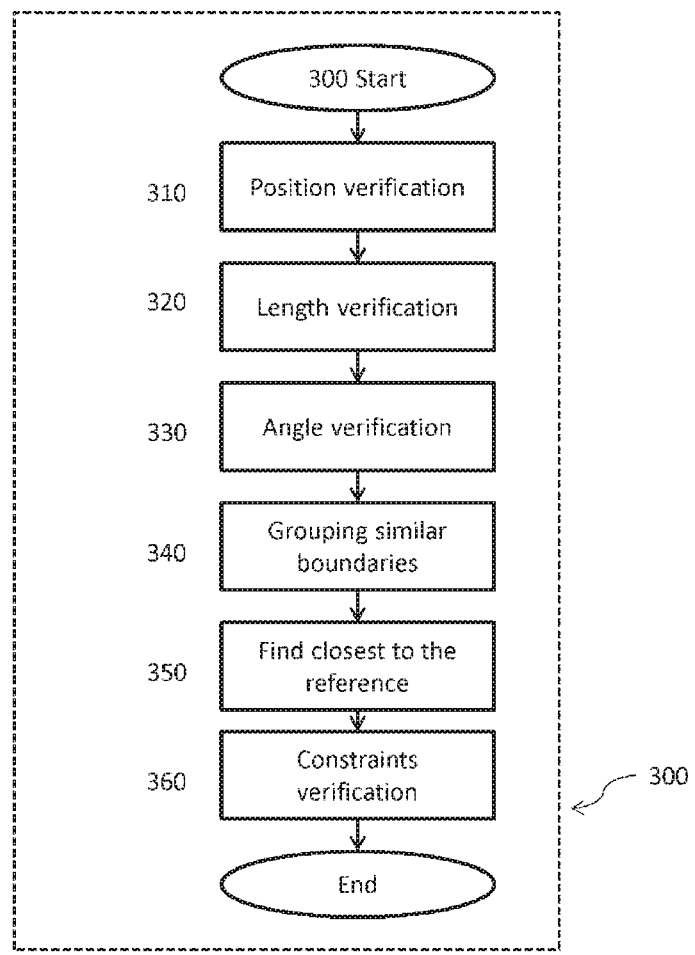

[Fig. 4]
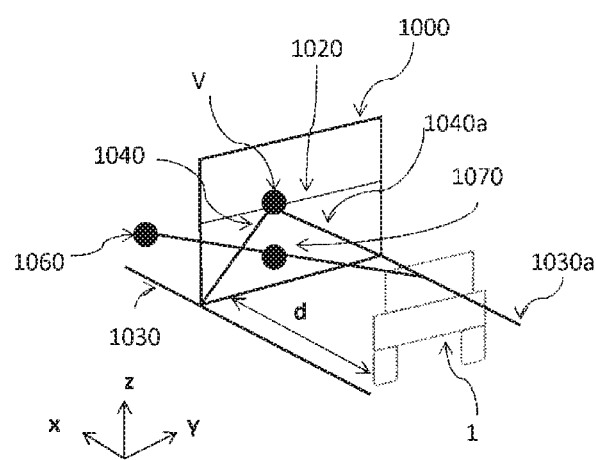
[Fig. 5]
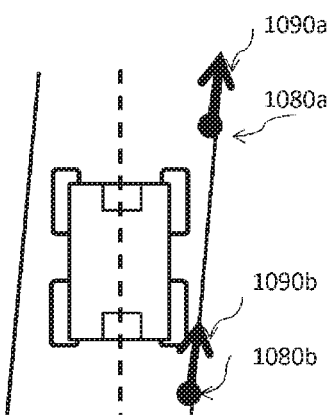

[Fig. 6]
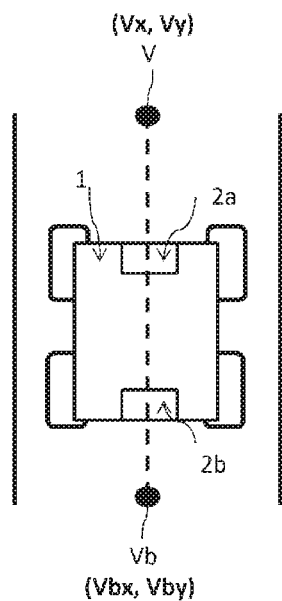
[Fig. 7]
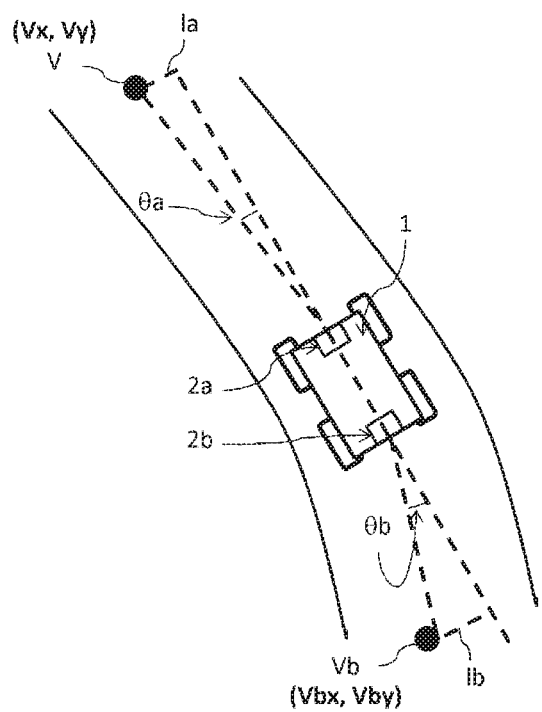

[Fig. 8]
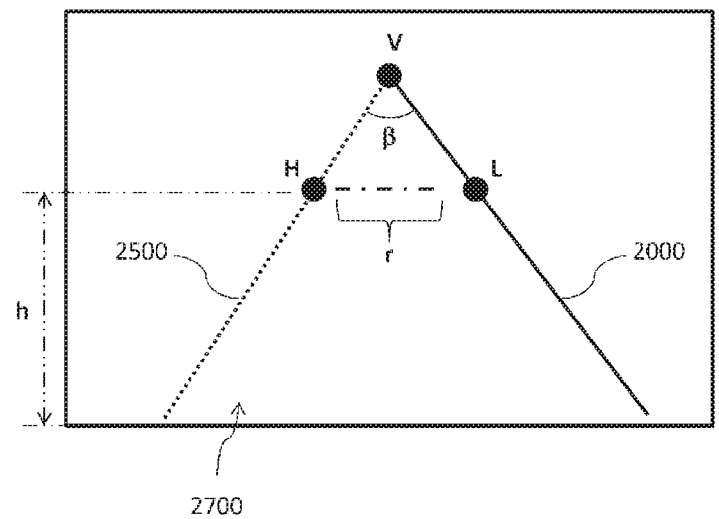
[Fig. 9]
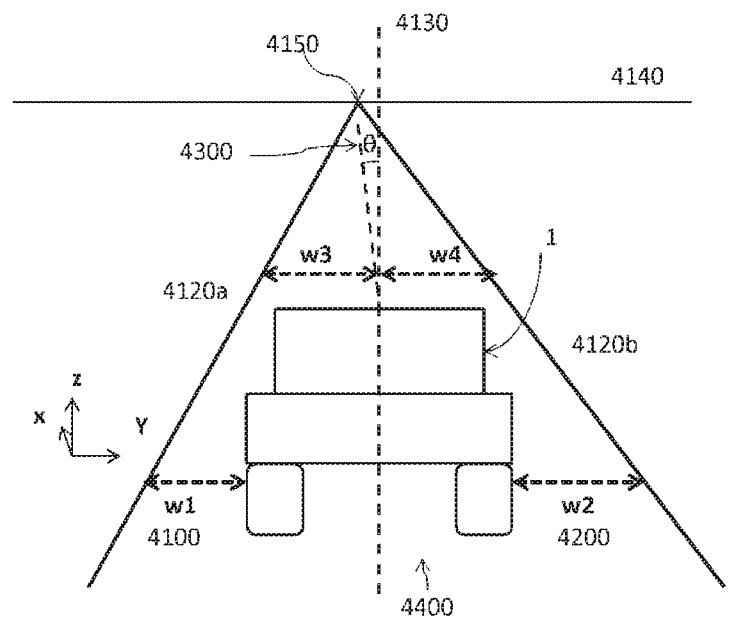

[Fig. 10]
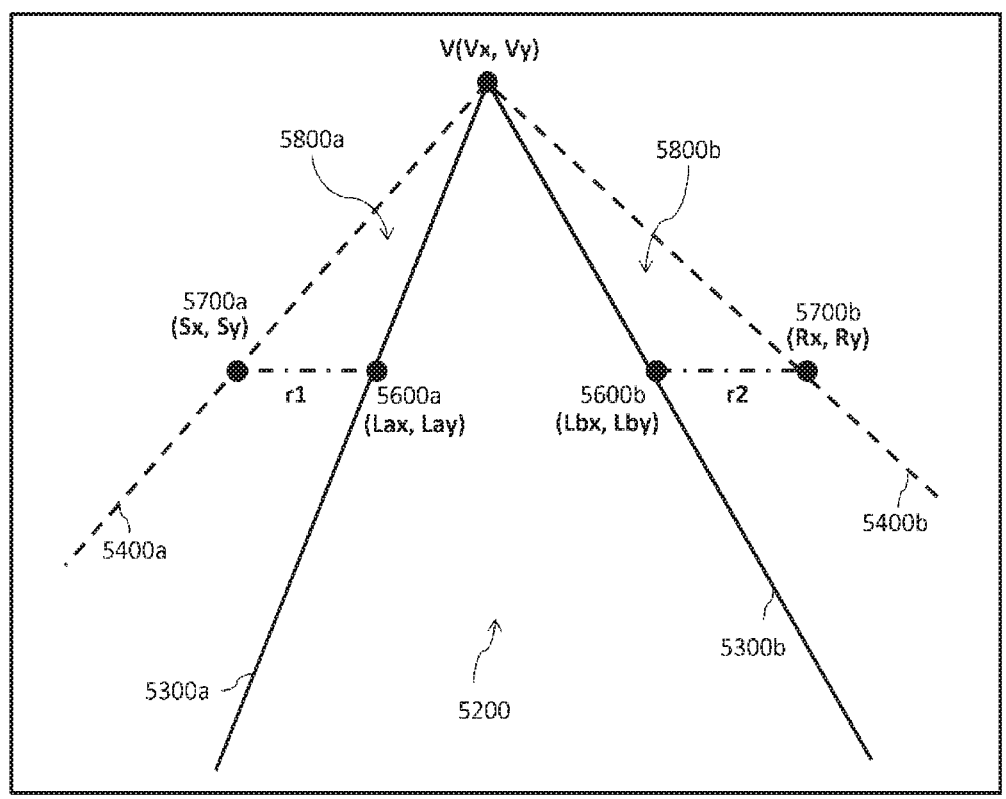

LANE DETECTION DEVICE AND LANE DETECTION METHOD

TECHNICAL FIELD

The present invention relates to a lane detection device.

BACKGROUND ART

An autonomous travel technology or a driving support technology that detects information of surrounding environment and performs estimation and control of a traveling state is developed for the improvement of convenience and safety of a moving body such as a robot or an automobile. Various sensors are used for detecting information of the surrounding environment. In general, a camera, a laser sensor, a millimeter wave radar, or the like is used as a sensor for measuring the surrounding environment and a Global Positioning System (GPS), an Inertial Measurement Unit (IMU), or the like is used as a sensor for measuring the position of a moving body.

In autonomous travel, the surrounding environment is measured while estimating the moving body's own position (the so-called "self-position" or "ego-position") by integration of velocity and angular velocity calculated by the IMU or GPS, the position of a landmark or an object which becomes a reference position is detected by the laser sensor or the camera, and a route for target route follow-up or for avoiding obstacles is generated.

In generating the route, a moving body which travels on a road needs to travel inside a lane defined by a white line or the like on a road and thus, it is important to detect the lane with high reliability. In general, the lane is detected using a camera and the white line may not be detected depending on an environmental condition. Several methods for estimating the position of undetected white lines have been proposed.

For example, in PTL 1, an image processing method which is characterized in that a road end of a road area is detected from an image captured by an image capturing unit and an undetected white line is estimated from a road end line estimated from the detected road end and parameters of road design is disclosed. In this technology, in a case where the white line cannot be detected from the captured image, the road end of the road area is detected from the captured image, the road end line is estimated from the road end, and the undetected white line is estimated from a vanishing point of the road end line and design parameters of the road. Here, the vanishing point is a point that when lines which are parallel in the real world are observed from a certain point, the lines are viewed as being terminated at one point. Furthermore, in this technology, in a case where the road end line cannot be detected, parallel lines of feature points such as a reflection plate of a guard rail, trees, or the like are estimated and the undetected white line is estimated using the vanishing points of parallel lines of feature points. With this, even in a case where it is unable to detect the white line in rainy conditions or the like, it is possible to estimate the undetected white line.

CITATION LIST

Patent Literature

PTL 1: JP-A-2000-132677

SUMMARY OF INVENTION

Technical Problem

In a case where an image of the white line is captured by using an image capturing unit such as a camera mounted on a moving body, it is unable to clearly capture an image of a boundary line of a lane and the lane may not be detected in the situation in which it is difficult to adjust contrast of pixels, especially, in rainy conditions or under the strong sunlight.

Solution to Problem

In order to solve the technical problem described above, a lane detection device according to one aspect of the present invention includes a first image capturing device which is fixed to a moving body and periodically captures a first image under a predetermined first image capturing condition, a second image capturing device which is fixed to the moving body and periodically captures a second image under a predetermined second image capturing condition different from the predetermined first image capturing condition, and an operation device, regarding a traveling lane on which the moving body travels, which detects a first boundary line of the traveling lane on the first image, detects a second boundary line of the traveling lane on the second image, and estimates a position of the first boundary line on the first image based on a position of the second boundary line on the second image, under a predetermined execution condition.

Advantageous Effects of Invention

In a case where the environment for capturing an image is changed, it is possible to increase reliability of detection of a traveling lane.

BRIEF DESCRIPTION OF DRAWINGS

FIG. 1 illustrates an example of configuration of a moving body.
FIG. 2 is a flowchart illustrating detection processing.
FIG. 3 is a flowchart illustrating operations of a filter.
FIG. 4 illustrates a relationship between positions within actual space and the coordinate on a captured image.
FIG. 5 illustrates a relationship between a vector of a captured image Pa and a vector of a captured image Pb.
FIG. 6 illustrates a relationship between a position of a vanishing point on the captured image Pa and a position of a vanishing point on the captured image Pb in a case where a moving body 1 moves forward.
FIG. 7 illustrates a relationship between a displacement of the vanishing point on the captured image Pa and a displacement of the vanishing point on the captured image Pb in a case where the moving body 1 travels through a curve.
FIG. 8 illustrates a boundary line estimation method.
FIG. 9 illustrates a positional relationship between a traveling lane and a moving body.
FIG. 10 illustrates detection of adjacent lanes.

DESCRIPTION OF EMBODIMENTS

In the following, embodiments of the present invention will be described with reference to the drawings.

Example 1

A lane detection device of the present example includes a second image acquisition device which is an auxiliary image acquisition device, in addition to a first image acquisition device mounted on a moving body. With this, even when a boundary line of a lane cannot be detected in the first image acquisition device, the lane detection device uses information from a second image acquisition device so as to make it possible to estimate a lane. The lane detection device of the present example includes a single auxiliary image acquisition device for brevity, but may include a plurality of second image acquisition devices. The second image acquisition device may be replaced with another means as long as the means can detect a boundary of a lane such as a white line or a yellow line.

The moving body of the present example is an automobile, but may include another moving body such as a robot.

FIG. 1 illustrates a configuration of a moving body of an example.

A moving body 1 includes a lane detection device 5 for detecting a position of a lane and driving units 6a, 6b, 6c, and 6d. The lane detection device 5 includes an image acquisition device 2a (first image capturing device) which periodically captures an image of a traveling environment around the moving body 1 under a predetermined image capturing condition (first image capturing condition) and acquires a captured image Pa (first image), an image acquisition device 2b (second image capturing device) which periodically captures an image of a traveling environment around the moving body 1 under an image capturing condition (second image capturing condition) different from the image acquisition device 2a and acquires a captured image Pb (second image), an image processing unit 3 that processes the captured images Pa and Pb acquired by the image acquisition devices 2a and 2b, and a control unit 4 which controls travelling of the moving body 1 based on information from the image processing unit 3 or performs warning.

An image capturing condition is defined by positions, directions, white balance, and diaphragm values of the image acquisition devices 2a and 2b with respect to the moving body 1. The image processing unit 3 and the control unit 4 are realized by at least one operation device. The operation device includes a memory and a processor. The memory stores a program and data and the processor executes processing according to the program. The image processing unit 3 and the control unit 4 may be two operation devices different from each other.

The image acquisition device 2a is a first image acquisition device which acquires the captured image Pa, which is a main image, for detecting the traveling lane on which the moving body 1 travels. The image acquisition device 2a of the present example is installed at a front part of the moving body 1 so as to be directed toward the advancing direction side. The image acquisition device 2b is a second image acquisition device that acquires a captured image Pb of the traveling lane. The image capturing condition of the image acquisition device 2a includes matters that an image of boundary lines of both sides of the traveling lane can be captured. The image acquisition device 2a may capture images of a plurality of lanes including adjacent lanes adjacent to the traveling lane. On the other hand, the image capturing condition of the image acquisition device 2b may be matters that an image of a portion of the boundary line can be captured. The image acquisition device 2b of the present example is installed at a rear part of the moving body 1 so as to be directed toward a side opposite to the advancing direction.

Each of the image acquisition device 2a and the image acquisition device 2b may be a monocular camera or a stereo camera. In a case where each of the image acquisition device 2a and the image acquisition device 2b is the stereo camera, a distance to the boundary line of the lane can be measured and thus, it is possible to enhance accuracy of lane detection using the distance. Thereafter, in a case where there is no need to distinguish the image acquisition device 2a and the image acquisition device 2b, each of the image acquisition device 2a and image acquisition device 2b is referred to as an image acquisition device 2. The image acquisition device 2 captures an image at each predetermined frame period and outputs the captured image.

A viewing angle of each image acquisition device 2 may be available as long as an image of the traveling lane can be captured using the viewing angle and each image acquisition device 2 may have a standard lens and a wide angle lens. Also, the image acquisition device 2a and the image acquisition device 2b may have a standard lens and a wide angle lens, respectively. In a case where the image acquisition device 2 includes the wide angle lens, an image may also be corrected by using predetermined lens characteristics. In the present example, for brevity, description will be made in a case where each image acquisition device 2 is a monocular camera having the standard lens. An image acquisition device capable of periodically outputting the captured image or having a plurality of cameras may be adopted as each image acquisition device 2.

The image acquisition device 2a and the image acquisition device 2b are installed on the moving body 1 under the condition that the devices 2a and 2b are not simultaneously influenced by an external environment such as rainy conditions or strong sunlight. For example, the image acquisition device 2a is installed forwardly in the front part of the moving body 1 (advancing direction side of moving body 1) and the image acquisition device 2b is installed rearwardly (in the rear part of the moving body 1 side opposite to the advancing direction). With this, for example, in a case where a large quantity of raindrops are stuck to a surface of the lens of the image acquisition device 2a when it rains and quality of the captured image of the image acquisition device 2a is degraded, raindrops are hardly stuck to a surface of the lens of the image acquisition device 2b directed toward a direction opposite to the advancing direction and thus, it is possible to use the captured image of the image acquisition device 2b. Also, in a case of the strong sunlight, the same effect can be obtained. However, when the lane is detected from the captured image of the image acquisition device 2a, the image processing unit 3 may not use the captured image of the image acquisition device 2b.

The lane detection device 5 may not include a single image acquisition device 2b, but may include a plurality of image acquisition devices 2b having different image capturing conditions. In this case, the image capturing conditions represented by parameters such as white balance, diaphragm values, or the like are adjusted to have different values from each other with respect to the plurality of image acquisition devices 2b so as to make it possible to more robustly detect the lane. For example, the lane detection device 5 includes an image acquisition device 2b for which the parameters are adjusted to be adapted for a bright place and an image acquisition device 2b for which the parameters are adjusted to be adapted for a dark place so as to make it possible to detect the lane without depending on brightness and darkness of an environment.

The image processing unit 3 executes detection processing that detects the traveling lane on which the moving body 1 travels at each frame from the captured images Pa and Pb acquired by the image acquisition device 2a and the image acquisition device 2b. Thereafter, a target frame for detection processing is referred to as a present frame and a frame immediately before the present frame is referred to as a previous frame. The image processing unit 3 may use at least one past frame instead of the previous frame.

In a case where priority is given to reduction of a processing load, when the right and left boundary lines of the traveling lane cannot be detected from the captured image Pa, the image processing unit 3 detects the traveling lane using the captured image Pb. In a case where priority is given to reliability, the image processing unit 3 may combine all information of the captured images Pa and Pb obtained from the image acquisition devices 2*a* and 2*b* and detect the boundary line and the traveling lane. There is a little possibility of occurrence of matters that the image processing unit 3 cannot detect the boundary line from the captured image Pa and the image processing unit 3 cannot detect the boundary line from the captured image Pb. The lane detection device 5 may include a plurality of image acquisition devices 2*b*. In this case, priorities are given to a plurality of captured images Pb, which are obtained respectively from the plurality of image acquisition devices 2*b*, to be processed.

The image processing unit 3 is, for example, a computer including a memory storing a program and data and a processor which operates according to the program.

The control unit 4 estimates the present position of the moving body 1, determines a future speed or a future moving direction, controls the driving units 6*a*, 6*b*, 6*c*, and 6*d*, and causes the moving body 1 to travel on the traveling lane, based on information of the traveling lane detected in the image processing unit 3. The control unit 4 may be connected with a display device and voice output device. In this case, warning may be output to the display device or the voice output device according to a relationship between the position of the traveling lane and the position of the moving body 1. The control unit 4 is, for example, a computer including a memory which stores a program and data and a processor which operates according to the program. The image processing unit 3 and the control unit 4 may be formed in a single computer. The lane detection device 5 may not include the control unit 4.

FIG. 2 is a flowchart illustrating detection processing.

In the figure, a solid line indicates a flow of processing for the captured image Pa and a broken line indicates a flow of processing for the captured image Pb.

First, in Step 100*a*, the image acquisition device 2*a* captures an image of a traveling environment around the moving body 1 under a predetermined image capturing condition Ca to generate the captured image Pa. In Step 100*b*, the image acquisition device 2*b* captures an image of the traveling environment around the moving body 1 under an image capturing condition Cb different from the predetermined image capturing condition Ca to generate the captured image Pb.

Thereafter, in Step 200, the image processing unit 3 detects a line such as a straight line or a curved line from each of the captured images Pa and Pb using predetermined generic algorithm. The detected line can be an element of the boundary line of the lane. Generic algorithm for detecting a line from an image includes, for example, Hough transform, stochastical Hough transform, random sampling Hough transform, or the like. Generic algorithm may also be an edge detector such as Canny transform, a Sobel filter, a zero-crossing method, or the like.

Thereafter, in Step 300, the image processing unit 3 detects the boundary line of the lane from the line detected from the captured image using a filter. Here, the filter detects a boundary line Ba (first boundary line) within the captured image Pa based on the line detected from the captured image Pa, generates boundary line information DBa indicating a position of the boundary line Ba on the captured image Pa, detects a boundary line Bb (second boundary line) within the captured image Pb based on the line detected from the captured image Pb, and detects boundary line information DBb indicating the boundary line Bb. Details of the filter will be described later.

Boundary line information is information representing the straight line on the captured image. For example, boundary line information indicating a single boundary line includes any of the coordinate of the vanishing point on the captured image, a single point on an image through which the boundary line passes, the coordinates of two points on the boundary line on the captured image, and straight line parameters (a linear function) on the captured image. The straight line parameters are, for example, coefficients a and b of the linear function. With this, the lane detection device 5 can represent the boundary lines Ba and Bb detected from the captured images Pa and Pb, respectively. The lane detection device 5 can convert boundary line information of the boundary line Bb into boundary line information of the boundary line Ba.

Thereafter, in Step 400, the image processing unit 3 determines whether the boundary lines Ba of both the left and right sides of the traveling lane are detected from the captured image Pa. In a case where the boundary line Ba of both the left and right sides are detected, the image processing unit 3 causes processing to proceed to Step 530 and in a case where the boundary line of at least one side is not detected, the image processing unit 3 causes processing to proceed to Step 500. In Step 500, the image processing unit 3 determines whether the boundary line Ba of one side among the boundary lines Ba of the left and right sides of the traveling lane is detected from the captured image Pa or not. In a case where the boundary line of one side is detected, the image processing unit 3 causes processing to proceed to Step 510, and in a case where any of the boundary lines is not detected, the image processing unit 3 causes processing to proceed to Step 580.

In Step 510 (in a case where boundary line of only one side is detected), the image processing unit 3 determines which boundary line of the left and right boundary lines Ba is detected from the captured image Pa.

Thereafter, in Step 580, the image processing unit 3, regarding an undetected boundary line, converts boundary line information DBb indicating the coordinate of the boundary line Bb detected from the captured image Pb into boundary line information DBa represented by the coordinate on the captured image Pa. In a case where the image processing unit 3 executes Step 580 without executing processing which uses the captured image Pb in Steps 200 and 300, the image processing unit 3 may execute processing which uses the captured image Pb and execute Step 580.

Thereafter, in Step 520, the image processing unit 3, acquires boundary line information DBa obtained by Step 580, regarding an undetected boundary line.

Thereafter, in Step 530, the image processing unit 3 generates lane information indicating the position of the traveling lane on the captured image Pa from two pieces of the boundary line information DBa and outputs the lane information to the control unit 4.

A plurality of lanes and boundary lines may be present on the captured image Pa. Here, the image processing unit 3 stores past (time series) lane information and collects a plurality of the boundary lines (of which features are similar) in the neighborhood into a single boundary line under the condition that the position or features (a position of vanishing point, a width of lane, or the like) of a lane is not significantly changed from past lane information, in order to specify respective lanes. The plurality of boundary lines in the neighborhood are, for example, boundary lines between which the difference in inclinations is within a predetermined range and between which the difference in intercepts is within a predetermined range.

Thereafter, in Step 570, the image processing unit 3 outputs boundary line information DBa and lane information to the filter and ends the flow. The filter performs detecting of the boundary line Ba on the basis of the position of the boundary line Ba of the past frame (for example, a previous frame). For example, the filter detects the boundary line Ba within a predetermined range from the boundary line Ba of the previous frame. With this, the reliability and efficiency of detection of the boundary line Ba are improved.

Here, a processing flow for a case where priority is given to reduction of a processing load is illustrated. In a case where priority is given to reliability, determination in Step 400 and Step 500 is not required, and in Step 530, the image processing unit 3 converts boundary line information DBb into boundary line information DBa and combines all pieces of boundary line information DBa obtained by detection and conversion to generate lane information.

According to the operations of the image processing unit 3 as described above, even in a case where at least any one of the two boundary lines Ba of the traveling lane on the captured image Pa is not detected, the lane detection device 5 can estimate the position of the boundary line Ba on the captured image Pa based on the position of the boundary line Bb on the captured image Pb. With this, the lane detection device 5 can robustly detect the traveling lane.

FIG. 3 is a flowchart illustrating operations of the filter.

In Step 300 described above, the filter extracts the boundary lines from all straight lines detected by generic algorithm.

In Step 310, the filter computes an intercept when the straight line detected in Step 200 is expressed by a linear function. In a case where the computed intercept is not within a predetermined intercept range, the filter deletes the straight line by regarding the straight line as noise. Next, in Step 320, the filter computes a length of the straight line not deleted in Step 310. In a case where the computed length is not within a predetermined length range, the filter deletes the straight line. In Step 330, the filter computes an inclination when the straight line not deleted in Step 320 is expressed by a linear function. In a case where the computed inclination is not within a predetermined intercept range, the filter deletes the straight line. The intercept range, the length range, and the inclination range are statistically determined in advance in order to delete a straight line (for example, a horizontal straight line) which clearly does not constitute a boundary line of a lane.

In Step 340, the filter regards the straight lines of which inclinations and intercepts are within a predetermined range and the straight lines of which the intercepts are within a predetermined range as the same straight lines among the straight lines not deleted in Step 330 and collects the straight lines into a single straight line.

In Step 350, the filter searches a straight line which is nearest to the predetermined boundary line (reference) for reference from the straight line collected in Step 340 and determines the searched straight line as the boundary line. By Step 570, the filter sets the boundary line having the highest presence probability in each of left and right of the captured image, from among pieces of past boundary line information (time series), as the boundary line for reference.

In Step 360, the filter compares the boundary line determined in Step 350 with boundary line information and lane information of the previous time obtained by Step 570. Here, the filter computes the difference between the position of the determined boundary line and the position of the boundary line of the previous time, and in a case where a size of the computed difference is greater than a predetermined difference threshold value, the filter deletes the boundary line and otherwise, the filter outputs the determined boundary line.

The operations of the filter are not limited to the flow. The sequence of respective steps may differ. The filter may also determine the boundary line using information of the GPS, an illuminance sensor, a color sensor, a laser sensor, or the like. With this, the boundary line is detected more accurately and more robustly. The filter may also refer to map information and determine a width, a color, a size, or the like of the detected boundary line. With this, the boundary line is more accurately detected.

FIG. 4 illustrates a relationship between positions within actual space and the coordinate on a captured image.

The figure illustrates a case where the observation point of the image acquisition device 2a of the moving body 1 is set as an origin and a point within actual space is projected to a captured image 1000 present in a plane parallel to the yz-plane which is away from the origin by a distance d, in a travelling environment of actual space.

The farthest end of a road seen from the moving body 1 is projected to the captured image 1000 as a horizontal line 1020. A boundary line 1030 is projected to the captured image 1000 as a line 1040. An intersection point between the line 1040 on the captured image 1000 and the horizontal line 1020 is a vanishing point V. Actually, a boundary line 1030*a* on the right side in the advancing direction is parallel to a boundary line 1030 on the left side. On the captured image 1000, the boundary line 1030*a* on the right side is projected to a line on the right side 1040*a* and intersected with the line 1040 on the left side at the vanishing point V. Here, an arbitrary point 1060 $(x, y, z)$ on actual space is projected to a point 1070 $(-, yd/x, zd/x)$ on the captured image 1000 and a vector $(X, Y, Z)$ on actual space corresponds to a vector directed toward the vanishing point V $(-, yd/x, zd/x)$ on the captured image 1000. Here, a height z of a road surface usually becomes a value which is hardly changed.

The image processing unit 3 uses the coordinate conversion method described above to thereby make it possible to convert the coordinate within actual space and the coordinate on the captured image 1000 each other.

An installation position and an installation direction of each of the image acquisition device 2a and the image acquisition device 2b are known and thus, in the image processing unit 3, boundary line information and lane information indicated by the coordinate on the captured image Pb can be easily converted into boundary line information and lane information indicated by the coordinate on the captured image Pa.

FIG. 5 illustrates a relationship between a vector of the captured image Pa and a vector of the captured image Pb.

As illustrated in the figure, when any of a position coordinate 1080*a* and a vector 1090*a* on a certain boundary line detected from the captured image Pa and a position coordinate 1080*b* and a vector 1090*b* on the boundary line detected from the captured image Pb can be detected, the image processing unit 3 can detect the boundary line. As described above, the height of the road surface is usually not changed and thus, the image processing unit 3 may perform calibration in advance using a captured image of an object at a known position within actual space to correlate the pixel positions on the captured images Pa and Pb with the coordinate of actual space. With this, the image processing unit can perform conversion of Step 580.

FIG. 6 illustrates a relationship between the position of the vanishing point on the captured image Pa and the position of the vanishing point on the captured image Pb in a case where the moving body 1 straightly moves.

The vanishing point V (first vanishing point) in the front of the moving body 1 is represented by the coordinate (Vx, Vy) on the captured image Pa. The vanishing point Vb (second vanishing point) in the rear of the moving body 1 is represented by the coordinate (Vbx, Vby) on the captured image Pb.

In a case where the moving body 1 straightly moves, a positional relationship between the vanishing point V on the captured image Pa and the vanishing point Vb on the captured image Pb is constant. The positional relationship is determined in advance from the position and direction of the image acquisition device 2a with respect to the moving body 1 and the position and direction of the image acquisition device 2b with respect to the moving body 1.

In a case where the vanishing point is not detected from the captured image Pa and the vanishing point is detected from the captured image Pb, the image processing unit 3 converts the coordinate of the vanishing point Vb on the captured image Pb into the coordinate of the vanishing point V on the captured image Pa by using the positional relationship, in Step 580.

FIG. 7 illustrates a relationship between a displacement of the vanishing point on the captured image Pa and a displacement of the vanishing point on the captured image Pb in a case where the moving body 1 travels through a curve.

The image processing unit 3 stores past boundary line information DBa and DBb. With this, the image processing unit 3 calculates a moving distance 1a of the vanishing point V on the captured image Pa from the previous frame to the present frame and a moving distance 1b of the vanishing point Vb on the captured image Pb from the previous frame to the present frame. The image processing unit 3 may detect a moving angle θa of the moving body 1 from the previous frame to the present frame and a moving angle θb of the moving body 1 from the previous frame to the present frame.

In a case where the moving body 1 is traveling through a curve, the positional relationship between the vanishing point V and the vanishing point Vb with respect to the moving body 1 is changed. Here, the image acquisition device 2a and the image acquisition device 2b are fixed to the moving body 1 and thus, a displacement relationship, which indicates a relationship between the displacement of the vanishing point V and the displacement of the vanishing point Vb, is constant. For example, as the displacement relationship, a moving distance relationship, which indicates a relationship between the moving distance 1a and the moving distance 1b, is constant. As the displacement relationship, a moving angle relationship, which indicates a relationship between the moving angle θa and the moving angle θb, is constant. Such a displacement relationship is determined in advance from the position and direction of the image acquisition device 2a with respect to the moving body 1 and the position and direction of the image acquisition device 2b with respect to the moving body 1.

In a case where the vanishing point V is not detected from the captured image Pa but the vanishing point Vb is detected from the captured image Pb, in Step 580, the image processing unit 3 does not convert the coordinate of the vanishing point Vb on the captured image Pb into the coordinate of the vanishing point V on the captured image Pa but convert the displacement of the vanishing point Vb on the captured image Pb into the displacement of the vanishing point V on the captured image Pa. For example, the image processing unit 3 converts the moving distance 1b into the moving distance 1a by using the moving distance relationship. Otherwise, the image processing unit 3 converts the moving angle θb into the moving angle θa by using the moving angle relationship. Thereafter, the image processing unit 3 estimates the coordinate of the vanishing point V of the present frame on the captured image Pa from the coordinate of the vanishing point V of the previous frame on the captured image Pa and the converted displacement.

With this, in a case where any of two boundary lines Ba is not detected from the captured image Pa, it is possible to detect the position of the vanishing point Vb from the captured image Pb and estimate the position of the vanishing point V from the position of the vanishing point Vb.

In a case where the size of the displacement is less than or equal to a predetermined displacement threshold value, the image processing unit 3 may convert the coordinate of the vanishing point Vb into the coordinate of the vanishing point V by using the positional relationship described above.

Description will be made on a boundary line estimation method in which lane information of the previous frame and the coordinate of the vanishing point V converted from the coordinate of the vanishing point Vb are used.

FIG. 8 illustrates a boundary line estimation method.

Lane information indicating the traveling lane includes information which specifies two boundary lines Ba defining both sides of the traveling lane. For example, lane information includes a coordinate of a vanishing point on the captured image Pa, a coordinate of a single point through which one of both boundary lines passes on the captured image Pa, and a width r of the traveling lane on the captured image Pa. The width r is a horizontal distance between two boundary lines Ba of the traveling lane at the predetermined height h on the captured image Pa. The height h is lower than the height of the vanishing point V on the captured image Pa. Lane information may include the coordinates of a plurality of points through which two boundary lines Ba constituting a pair on the captured image Pa pass. Lane information may include straight line parameters (a linear function) indicating two boundary lines Ba that constitute a pair on the captured image Pa. Lane information may include the coordinate of the vanishing point on the captured image Pa, the straight line parameters indicating a single boundary line, an angle β formed by two boundary lines. With this, the lane detection device 5 is able to represent the traveling lane by using boundary line information of the boundary lines Ba on the right and left of the traveling lane.

The width r is not limited to the horizontal distance at the height h, but may be represented by the vector from a single point indicated by lane information. In map information, the width of the traveling lane is frequently described in actual space and thus, the way of using the width r has satisfactory matching property with other data. The width of the traveling lane within actual space and the width r of the traveling lane on the captured image Pa are converted each other by the coordinate conversion method described above.

In a case where a right boundary line 2000 on the captured image Pa is detected and the vanishing point Vb is converted into the vanishing point V, in Step 580, the image processing unit 3 estimates a left boundary line 2500 based on lane information of the previous frame and the vanishing point V of the present frame.

In Step 520, the image processing unit 3 acquires the width r of the previous frame based on lane information of the previous frame. The image processing unit 3 estimates a point H (Hz, Hy), which is away to the left direction by the width r, from a point L having the height h on the right boundary line 2000 and substitutes the coordinate of the point H and the coordinate of the vanishing point V into the linear function y=ax+b so as to estimate the boundary line 2500.

The image processing unit 3 may acquire the angle θ formed by two boundary lines intersecting with each other at the vanishing point V based on lane information of the previous frame in the captured image Pa of the previous frame, instead of the width r of the previous frame. In this case, in Step 580, the image processing unit 3 estimates the boundary line 2500 from the boundary line 2000, the angle β and the vanishing point V.

With this, in a case where any of two boundary lines Ba is not detected from the captured image Pa, the boundary lines Ba can be estimated from the width r of the past frame and the position of the vanishing point V converted from the position of the vanishing point Vb.

In a case where any of the two boundary lines of the traveling lane cannot be detected from the captured image Pa, the image processing unit 3 may estimate two boundary lines Ba on the captured image Pa of the present frame from two boundary lines Bb detected from the captured image Pb of the present frame and two boundary lines Ba detected from the captured image Pa of the previous frame, by using the displacement relationship.

According to the present example, even in a case where the boundary lines Ba of the traveling lane cannot be detected from the captured image Pa, the lane detection device 5 can estimate the boundary lines Ba based on the captured image Pb.

Example 2

The lane detection device 5 of the present example executes self-position estimation of a moving body using detected lane information.

FIG. 9 illustrates a positional relationship between the traveling lane and the moving body.

A distance w1 is a distance from the left end of the moving body 1 to a boundary line 4120*a* on the left side of the traveling lane in actual space. A distance w2 is a distance from the right end of the moving body 1 to a boundary line 4120*b* on the right side in actual space. The control unit 4 calculates the distances w1 and w2 from lane information using the coordinate conversion method described above. The left and right distances may be distances w3 and w4 that extend not from the end of the moving body 1 but from a center line 4130 of the moving body 1 to the left and right boundary lines.

The control unit 4 calculates an advancing direction 4300 using the IMU. An error of position estimation becomes large due to the influence by an error of the IMU and thus, the control unit 4 calculates a relative direction of the traveling lane 4400 indicated in lane information with respect to the advancing direction detected by the IMU and corrects the advancing direction 4300 using the relative direction. In this figure, a vanishing point 4150 is present on a horizontal line 4140. In a case where the vanishing point 4150 is present on the center line (optical axis direction of image acquisition device 2*a*) 4130 of the moving body 1, the moving body 1 is travelling in parallel with the traveling lane 4400. In a case where the vanishing point 4150 is present on the left side to the center line 4130 of the moving body 1, the advancing direction 4300 of the moving body 1 is inclined to the right for the direction of the traveling lane. When the coordinate of the vanishing point of actual space is set as (d, yy, 0) and the coordinate conversion method described above is used, an inclination (y direction/x direction) within the xy-plane with respect to the moving body in the direction of vanishing point becomes yy/d. That is, the direction of the moving body 1 can be calculated using the position of the vanishing point.

The automobile travels at high speed and thus, when a boundary line cannot be detected even in any single frame, the error becomes large and influences on the entire system. For that reason, it is necessary to accurately detect the traveling lane in a short time. According to the present example, the lane detection device 5 can save lane information in time series, estimate the newest lane information based on past lane information in a case where the newest lane information cannot be detected, and perform lane detection based on the newest lane information and self-position estimation.

Example 3

The lane detection device 5 of the present example detects an adjacent lane, in addition to the traveling lane.

FIG. 10 illustrates detection of adjacent lanes.

A left boundary line 5300*a* and a right boundary line 5300*b* are a traveling lane 5200 detected by the same detection processing as that of the example 1. A left boundary line 5400*a* present in the left direction of the left boundary line 5300*a* corresponds to the left end of a left adjacent lane. A right boundary line 5400*b* present in the right direction of the right boundary line 5300*b* corresponds to the right end of a right adjacent lane. A width r1 is a width of the left adjacent lane detected by detection processing for the previous frame. A width r2 is a width of the right adjacent lane detected by detection processing for the previous frame.

A point 5600*a* is a single point (Lax, Lay) which is on the left boundary line 5300*a* of the traveling lane 5200 and is present at the height h on the captured image Pa. A point 5600*b* is a single point (Lbx, Lby) which is on the right boundary line 5300*b* of the traveling lane 5200 and is present at the height h on the captured image Pa. A point 5700*a* is a point (Sx, Sy) which is away from the point 5600*a* by the width r1 to the left direction. A point 5700*b* is a point (Rx, Ry) which is away from the point 5600*b* by the width r2 to the right direction. An adjacent lane 5800*a* is an adjacent lane on the left side of the traveling lane 5200. An adjacent lane 5800*b* is an adjacent lane on the right side of the traveling lane 5200. The vanishing point V is a vanishing point (Vx, Vy) detected by detection processing for the previous frame.

In a case where the moving body 1 performs lane change during travelling on the traveling lane 5200, the image processing unit 3 detects at least any of the left boundary line 5400*a* and the right boundary line 5400*b*, in addition to the traveling lane 5200, in order to calculate the advancing direction 4300 of the moving body 1. When the adjacent lanes 5800*a* and 5800*b* are detected at all times, the processing load becomes large, and accordingly, the lane detection device 5 performs calculation of lane information when needed. For example, in a case where the moving body 1 makes lane change to the right side, the control unit 4 issues an instruction to detect the right adjacent lane to the image processing unit 3. In response to the instruction, the image processing unit 3 detects information of the traveling lane 5200 and the right boundary line 5400b and detects the adjacent lane 5800b. With this, the image processing unit can detect the boundary line with the minimum processing load. The control unit 4 executes control of lane change using information of the traveling lane 5200 and the adjacent lane 5800b detected. With this, the control unit can acquire the position of the traveling lane 5200 required before lane change and the position of the adjacent lane 5800b required after lane change.

According to the examples described above, the lane detection device 5 is able to perform lane detection of which the processing load is low and reliability is high (robust). Especially, in the situation, such as rainy conditions or the strong sunlight (backlight, glare, reflection), in which it is difficult to adjust contrast of pixels, even in a case where the lane cannot be detected from the captured image of a single image processing device, the lane can be frequently detected from a captured image of another image acquisition device. In such a case, it is possible to convert the position of the boundary line detected from the captured image Pb into the position of the boundary line on the captured image Pa and detect the lane using converted information.

As described above, although the embodiments of the present invention are described, the embodiments are illustrative ones for explaining the present invention and are not intended to limit a range of the present invention to the configurations described above. The present invention may also be embodied in various different kinds of forms.

REFERENCE SIGNS LIST

1: moving body
2a, 2b: image acquisition device
3: image processing unit
4: control unit
5: lane detection device
6a, 6b, 6c, 6d: driving unit

The invention claimed is:

1. A lane detection device comprising:
a first image capturing device which is fixed to a moving body and periodically captures a first image under a predetermined first image capturing condition, and is directed toward an advancing direction side of the moving body;
a second image capturing device which is fixed to the moving body and periodically captures a second image under a second image capturing condition different from the predetermined first image capturing condition, and is directed toward a side opposite to the advancing direction; and
a processor, regarding a traveling lane on which the moving body travels, which is configured to detect a first boundary line of the traveling lane on the first image, detect a second boundary line of the traveling lane on the second image, and estimate a position of the first boundary line on the first image based on a position of the second boundary line on the second image under a predetermined execution conditions;
wherein the processor calculates a position of a first vanishing point on the first image based on a position of the first boundary line, stores the position of the first vanishing point, estimates calculation of a second vanishing point on the second image based on the position of the second boundary line, and stores the position of the second vanishing point,
the processor stores in advance a displacement relationship between a first displacement of the position of the first vanishing point in two frames of which image capturing times are different from each other and a second displacement of the position of the second vanishing point in the two frames, and
under the execution condition, the processor calculates the second displacement based on the position of the second vanishing point of a past frame and the position of the second vanishing point of a present frame, calculates the first displacement from the second displacement using the displacement relationship, estimates the position of the first vanishing point of the present frame based on the position of the first vanishing point of the past frame and the first displacement, and estimates the position of the first boundary line based on the position of the first vanishing point of the present frame.

2. The lane detection device according to claim 1, wherein the first image capturing condition includes any of a position and a direction of the first image capturing device with respect to the moving body, a diaphragm of the second image capturing device, and white balance of the second image capturing device, and
the second image capturing condition includes any of a position and a direction of the second image capturing device with respect to the moving body, a diaphragm of the second image capturing device, and white balance of the second image capturing device.

3. The lane detection device according to claim 1, wherein the execution condition is that at least any one of two boundary lines of the traveling lane on the first image is not detected.

4. A lane detection device comprising:
a first image capturing device which is fixed to a moving body and periodically captures a first image under a predetermined first image capturing condition;
a second image capturing device which is fixed to the moving body and periodically captures a second image under a second image capturing condition different from the predetermined first image capturing condition; and
a processor, regarding a traveling lane on which the moving body travels, which is configured to detect a first boundary line of the traveling lane on the first image, detect a second boundary line of the traveling lane on the second image, and estimate a position of the first boundary line on the first image based on a position of the second boundary line on the second image under a predetermined execution condition,
wherein the first image capturing condition includes any of a position and a direction of the first image capturing device with respect to the moving body, a diaphragm of the second image capturing device, and white balance of the second image capturing device, and
the second image capturing condition includes any of a position and a direction of the second image capturing device with respect to the moving body, a diaphragm of the second image capturing device, and white balance of the second image capturing device,
wherein the first image capturing device is directed toward an advancing direction side of the moving body,
wherein the second image capturing device is directed toward a side opposite to the advancing direction,
wherein the execution condition is that at least any one of two boundary lines of the traveling lane on the first image is not detected, and wherein the processor calculates a position of a first vanishing point on the first image based on a position of the first boundary line, stores the position of the first vanishing point, estimates calculation of a second vanishing point on the second image based on the position of the second boundary line, and stores the position of the second vanishing point, the processor stores in advance a displacement relationship between a first displacement of the position of the first vanishing point in two frames of which image capturing times are different from each other and a second displacement of the position of the second vanishing point in the two frames, and under the execution condition, the processor calculates the second displacement based on the position of the second vanishing point of a past frame and the position of the second vanishing point of a present frame, calculates the first displacement from the second displacement using the displacement relationship, estimates the position of the first vanishing point of the present frame based on the position of the first vanishing point of the past frame and the first displacement, and estimates the position of the first boundary line based on the position of the first vanishing point of the present frame.

5. The lane detection device according to claim 4, wherein the processor calculates a horizontal distance between the two boundary lines at a predetermined height on the first image and stores the horizontal distance, and in a case where a position of one boundary line of the two boundary lines on the first image is detected from the first image, the processor estimates a position of the other boundary line based on the position of the first vanishing point, the position of the one boundary line, and the horizontal distance calculated from the past frame.

6. The lane detection device according to claim 4, wherein the processor calculates an angle between the two boundary lines at a predetermined height on the first image and stores the angle, and in a case where a position of one boundary line of the two boundary lines on the first image is detected from the first image, the processor estimates a position of the other boundary line based on the position of the first vanishing point, the position of the one boundary line, and the angle calculated from the past frame.

7. The lane detection device according to claim 4, wherein the position of the first boundary line includes any of a plurality of positions of points on the first boundary line and a coefficient of a linear function indicating the first boundary line, and the position of the second boundary line includes any of a plurality of positions of points on the second boundary line and a coefficient of a linear function indicating the second boundary line.

8. The lane detection device according to claim 7, wherein the processor calculates lane information indicating the position of the traveling lane on the first image based on the position of the first boundary line, and the lane information includes any of a position of one boundary line of the first boundary lines, the position of the vanishing point on the first image, and the horizontal distance between the two boundary lines at the predetermined height on the first image, a position of one boundary line of the first boundary lines, the position of the vanishing point on the first image, and an angle formed by the two boundary lines on the first image, and the positions of the two boundary lines of the first boundary line information.

9. The lane detection device according to claim 8, further comprising:

an inertia measurement device that detects an advancing direction of the moving body, wherein the processor estimates the position of the moving body with respect to the traveling lane based on the detected advancing direction and the lane information.

10. The lane detection device according to claim 8, wherein the processor acquires lane change information indicating lane change of the moving body and estimates a position of an adjacent lane adjacent in a direction of the lane change of the traveling lane based on the lane change information and the lane information.

11. A lane detection method comprising:

capturing a first image periodically under a predetermined first image capturing condition by a first image capturing device which is fixed to a moving body and is directed toward an advancing direction side of the moving body;

capturing a second image periodically under a predetermined second image capturing condition different from the first image capturing condition by a second image capturing device which is fixed to the moving body and is directed toward a side opposite to the advancing direction; and detecting a first boundary line of a traveling lane on the first image, detecting a second boundary line of the traveling lane on the second image and calculating a position of the first boundary line on the first image based on a position of the second boundary line on the second image under a predetermined execution condition, regarding the traveling lane on which the moving body travels, by an operation device, calculating a position of a first vanishing point on the first image based on a position of the first boundary line, storing the position of the first vanishing point, calculating a position of a second vanishing point on the second image based on the position of the second boundary line, and storing the position of the second vanishing point;

storing in advance a displacement relationship between a first displacement of the position of the first vanishing point in two frames of which image capturing times are different from each other and a second displacement of the position of the second vanishing point in the two frames; and under the execution condition, calculating the second displacement based on the position of the second vanishing point of a past frame and the position of the second vanishing point of a present frame, calculating the first displacement from the second displacement using the displacement relationship, estimating the position of the first vanishing point of the present frame based on the position of the first vanishing point of the past frame and the first displacement, and estimating the position of the first boundary line based on the position of the first vanishing point of the present frame.

* * * * *